United States Patent [19]

Long

[11] Patent Number: 5,392,559
[45] Date of Patent: Feb. 28, 1995

[54] SURFACES COATED WITH FLUOROCARBON RESINS UPON WHICH INSECTS CANNOT CLIMB OR ALIGHT AND METHODS AND MEANS FOR THEIR ESTABLISHMENT

[75] Inventor: Roger H. Long, Auburn, Pa.
[73] Assignee: Bend Research, Inc., Bend, Oreg.
[21] Appl. No.: 81,230
[22] Filed: Jun. 25, 1993

Related U.S. Application Data

[63] Continuation-in-part of Ser. No. 694,689, May 2, 1991.
[51] Int. Cl.$^6$ .............................................. A01M 1/20
[52] U.S. Cl. ..................................... 43/121; 43/132.1; 43/108; 52/101
[58] Field of Search ..................... 43/124, 132.1, 108, 43/109, 121, 58, 107; 52/101

[56] References Cited

U.S. PATENT DOCUMENTS

4,263,740 4/1981 Hemsarth ............................... 43/114

FOREIGN PATENT DOCUMENTS

0160712 11/1985 European Pat. Off. ............... 43/121
3126447 5/1988 Japan ..................................... 43/121
3126448 5/1988 Japan ..................................... 43/121

OTHER PUBLICATIONS

Article entitled "Techniques for Collecting, Rearing, and Handling Imported Fire Ants", by U.S. Department of Agriculture, Apr. 1981.

Primary Examiner—P. Austin Bradley
Assistant Examiner—James Miner
Attorney, Agent, or Firm—Chernoff, Vilhauer, McClung & Stenzel

[57] ABSTRACT

A dispersion of a polytetrafluoroethylene resin having a particle size between about 0.05 and 0.5 microns, a suspending agent and a viscosity less than 15 centipoise. The dispersion has long shelf life, a reduced tendency to fibrillate and is comparatively stable when acted upon by shear forces and elevated temperatures. The dispersion is well adapted to be sprayed onto surfaces to form a dried film upon which insects can not climb, alight or affix nests or webs. The dispersion can be sprayed without fibrillation dispersion and the dried coatings are adherent, may be washed and remain effective over long periods of time.

9 Claims, 7 Drawing Sheets

SURFACES COATED WITH FLUOROCARBON RESINS UPON WHICH INSECTS CANNOT CLIMB OR ALIGHT AND METHODS AND MEANS FOR THEIR ESTABLISHMENT

This application is a continuation-in-part of my co-pending PCT patent application Ser. No. 92/03648, filed on 30 Apr. 1992, which in turn is a continuation-in-part of my U.S. patent application Ser. No. 07/694,689, filed on May 2, 1991.

BACKGROUND OF THE INVENTION

1. Field of the Invention.

This invention relates coated surfaces upon which insects can neither climb nor alight and methods and means for applying the coatings. More particularly, the invention relates to surfaces coated with non-toxic, non-debilitating fluorocarbon resin films which are effective to discourage crawling insects from infesting a site where they are not wanted, to cause crawling insects to abandon a site they have infested, to confine crawling insects within a given enclosure and to prevent insects from alighting, climbing or building nests or webs on selected surfaces.

2. Discussion of the Prior Art

The crawling insects with which this invention is concerned are those which are pests or nuisances to man. These include, for example, gypsy moths that crawl from the ground up into trees and devour the leaves of the trees; cockroaches, spiders, scales and palm aphids which are often offensive in appearance and may carry and spread disease; and, perhaps the most widespread and annoying of the general group, the ubiquitous ant. The ant exists in many forms including the leaf eater, Argentine, carpenter and pharaoh ants, the termites and, of course, the militant and destructive fire ant. It is the primary concern of this invention to restrict the movement and colonization of these insects.

Many pesticides and insecticides are available which will kill or disrupt the life cycle of crawling insects, but essentially all of them are environmentally objectionable because of their toxicity. The toxicity of pesticides can endanger the health of animals and humans and curtail their use when food is present as in dinning rooms, kitchens, picnic tables, pet food dishes and the like. It is also well recognized that insects develop strains which are resistent to the effect of a given insecticide over a period of time.

As an alternative to insecticides, it has been proposed to control insects with traps. One common type of trap is built with downwardly and inwardly sloping side walls that are covered with a loosely adhering powdered material, such as talcum powder. The loosely adhering particles are dislodged when an insect attempts to crawl over them and the insect falls with the powder into a trap. This technique is relied on in U.S. Pat. No. 4,263,740 which teaches the application of particulate organic and inorganic materials to a vertical or sloping surface. The particulate materials are applied by coating a surface with a liquid dispersion of polytetrafluoroethylene, sand, clay, ground pyrophyllite-aluminum silicate, cellulosics, talc, sand, and flour. When the liquid content of the dispersion is evaporated, a dry, loosely adherent layer of powder remains on the surface. The size of the particles is not critical since patentee teaches that the particulate material of the dispersions may vary from less than 1 micron to more that 1000 microns in diameter, although his preferred range is from 100 to 300 microns.

In use, patentee relates, when an insect first crawls over a coated surface at the entrance to a trap, its sticky pads (pulvilli) are coated with the loosely adhered powders and the ability of the pulvilli to adhere to a smooth surface is rendered ineffective. If and when the insect reverses its direction in an attempt to crawl up a smooth slanting sidewall and escape from the trap, its pulvilli are no longer "sticky" and the insect must grip the particulate material with its tarsal claws to gain a purchase. At this point, the weight of the insect grasping the particulate matter dislodges the powder and causes an "avalanche" of the loosely held particles carrying the insect down with them into the trap.

The powdery coatings taught in U.S. Pat. No. 4,263,740 have a limited useful life. They are consumed in use when one or more "avalanche" occurs and they will break loose and flake away if the coated surface is impacted as by bumping or shaking or is exposed to the elements such as wind and rain. A less obvious defect in the powdery coatings is that loose powder can suffocate the insects and destroy their value to a hobbyist or an entomologist.

Entomologists have discovered that they can nondestructively confine crawling insects in tub shaped containers by painting circumferential, horizontal bands of a water dispersion of finely divided polytetrafluoroethylene, generally about 0.05 to 0.5 microns in diameter, on the inside walls of the container. Perhaps because of their extremely small size, the particles making up the dried coating, unlike the coatings of U.S. Pat. No. 4,263,740, adhere sufficiently well to the side walls of the container to prevent them from being pulled loose when traversed by an insect.

It was discovered that the insects could not climb these dried films of sub micron resin polytetrafluoroethylene particles. Since the insects appear to slide down the coated surfaces when they try to climb them, it seemed reasonable to assume, even though it has now been proven false, that the phenomenum was due to the slippery surface characteristics (low coefficient of friction) of polytetrafluoroethylene.

The dispersions that the entomologists have used are commercial formulations that typically contain about 60%, by total weight, of 0.05 to 0.5 micron sized polytetrafluoroethylene particles suspended in water along with from about 5% to 8%, by weight of polytetrafluoroethylene, of a wetting agent and stabilizer. At room temperatures (20°–25° C.) the dispersions have viscosities of from about 20 to 27 centipoise.

An example of the method used by entomologists, can be found in a trap for flying insects disclosed in European patent application 0 160 712 A1 to Montedison S.p.A. Here flying insects are prevented from crawling out of a trap having a funnel shaped (30°–60° cone angle) entrance by coating the interior surface of the funnel with dispersions of polytetrafluoroethylene. The dispersions are the same as those described above as used by entomologists which are commercially available formulations of aqueous dispersions of polytetrafluoroethylene. They are described in the patent application as being comprised of a granulometric dispersion of between 0.2 and 0.4 microns of 50–61% by weight polytetrafluoroethylene and 2.5–4% by weight of a nonionic dispersant, the rest being water. It is further taught that the coatings of these dispersions can be applied by spraying or brushing. The European patent application acknowledges that the prior art has made use of sticky substances to entrap insects and powdered substances, such as kaolin or talc, to reduce an insects ability to cling to a surface. The patent application states that the powdered substances of the prior art are not useful over prolonged periods since the powders are easily removed by the mechanical action of wind, rain and humidity.

The coatings of the entomologists and those disclosed in the European patent application improved over the prior powdered coatings, but they too have their deficiencies both with respect to the methods by which they are applied and to the characteristics of the applied coatings. Considering the coatings themselves the following is a listing of some of their failings.

1. While the coatings adhere to their substrates somewhat better than do the powdered coatings, the polytetrafluoroethylene coatings are so loosely bound to their substrates that they can be removed by running tap water over the surface, by lightly brushing the surface, by flexing the substrate or by applying and removing ordinary transparent adhesive tape.
2. The coatings are effective only for relatively short periods of time. In discussions with entomologists who use these coatings, it has been uniformly reported that the effective life of the coatings range from as short as several weeks to a maximum of about two, or, at most, three months. The mechanisms of the failures are not understood as often there is no apparent or observable change in the appearance of the coating.
3. The effectiveness of the coating is adversely effected if more than a single layer is applied to a surface. Care is required to avoid overcoating when the dispersion is applied for, otherwise, multiple coating layers will crack or flake off rendering the coating ineffective to prevent insects from crawling on a surface. It follows that it is necessary to remove all of an old coating which has lost its effectiveness before a new coating is applied. The difficulty of thoroughly removing all of an old coating is enough of a chore to make it common practice among entomologists to discard used insect containers after they have lost their effectiveness rather than to clean and recoat the old containers.
4. The effectiveness of the coatings are temperature sensitive. When exposed to ambient temperatures over about 30°–35° C., insects begin climbing over surfaces that they could not climb at lower ambient temperatures.
5. Depending on the dispersing agent used in making up the polytetrafluoroethylene dispersions, most coatings loose their effectiveness when they become damp or wet. This limits the utility of the coatings to protected environments where they can be sheltered from the effects of rain, snow, dew and other surface moisture.
6. The relatively poor adhesion of the coatings makes it impractical to clean the coated surfaces. For example, if a coating is applied to a dog dish, the coating will not survive even one dish washer cycle.

The method of application of coatings from polytetrafluoroethylene dispersions as taught by the prior art, also raises a number of problems.

1. The effectiveness of the coating is influenced by the thickness of the coating. It has now been discovered that better coatings are obtained if the thickness of the dried coating is preferably 1 mil or less. This desired thickness has not been obtained in the prior art for a number of reasons including the viscosity of the available polytetrafluoroethylene dispersions, the means by which the coatings are applied as by brushing or dipping, and the dependency of the thickness on the angle the substrate makes to the horizontal as it dries. In this latter regard it may be understood that if a freshly coated surface is allowed to dry while in a vertical position, the dispersion will flow by gravity down the plate, run-off will be maximized and the coating thickness will be minimized. If, on the other hand, the surface is oriented horizontally, the run-off will be minimized and the thickness of the coating maximized.
2. The viscosity of commercially available polytetrafluoroethylene dispersions increases rapidly at higher temperatures. As a result, the coating thickness is a function of the ambient temperatures at the time the coating is applied.
3. Polytetrafluoroethylene resins are soft and subject to fibrillation when exposed to shear forces. The effect is so pronounced that fibrillation occurs when polytetrafluoroethylene dispersions are forced through an orifice as in spraying. For this reason the dispersions are difficult to handle and, for practical reasons, cannot be sprayed unto a substrate. They can not be pumped through feed lines and care must be taken to avoid fibrillation if the dispersions are shaken, stirred or pumped.
4. The high viscosity (about 20 centipoise and over) of the polytetrafluoroethylene dispersions of the prior art make it difficult to form a smooth coating because of the relatively high viscosity and poor flow-out.
5. The polytetrafluoroethylene dispersions of the prior art are unstable and coagulate during prolonged storage. Temperatures above 25° C. accelerate the coagulation of the dispersions and temperatures below the freezing point of the liquids destroy the dispersion.

SUMMARY OF THE INVENTION

Accordingly, it is an object of this invention to apply surface coatings to substrates which coatings prevent crawling insects from climbing on the surfaces and discourage crawling insects from infesting defined certain areas.

Another object of this invention is to protect areas from infestation from crawling insects without using insecticides or toxic substances that are harmful to the environment.

Another object of this invention is selectively to control the type or size of crawling insects which enter or leave an area.

Another object of this invention is to prevent flying or hopping insects from alighting on or clinging to surfaces such as walls or ceilings.

Another object of this invention is to provide a device for trapping insects.

Another object of this invention is to create an environment which is not hospitable to crawling insects and will cause them to leave and establish their nests elsewhere.

Another object of this invention is to provide wearing apparel such as shoes and boots, ankle protectors, outer garments and the like which will prevent crawling insects from climbing onto the human body.

Another object of this invention is to prevent insects from crawling up the legs of furniture.

Another object of this invention is to provide methods and means for controlling the movement of crawling insects which methods are simple and effective, remain effective over prolonged periods of time, withstand moderate abuse, and remain effective at elevated temperatures and when wet.

Another object of this invention is the provision of methods and means to control the movement of crawling insects that retain their effectiveness for long periods of time even when used in outdoor environments and exposed to all weather conditions.

Another object of this invention is to provide coatings of polytetrafluoroethylene which can withstand washing under running tap water or in a dishwasher.

Another object of this invention is to provide dispersions of a polytetrafluoroethylene resins having a particle size between about 0.05 and 0.5 microns which have improved storage life, less sensitivity to higher temperatures, mixing and forces of shear and reduced tendencies to fibrillation.

These and other objects of this invention are achieved by coating a surface with an aqueous dispersion of polytetrafluoroethylene particles, preferably less than 0.5 microns in size as measured along their major axis, and drying the dispersion to form a coherent film free from bubbles and other visible surface imperfections, characterized in that the viscosity of the dispersion is less than 16 centipoise.

Insects cannot climb on the surfaces in accordance with the foregoing if the surfaces are at an angle to the horizontal. The minimum angle required to impede the progress of an insect over a surface coated in accordance with this invention will vary with the characteristics of the insect such as its size, whether it has any sticky substances on its legs, whether its tarsi have claws, and in the case of crawling pests such as caterpillars, how many legs it has. Nonetheless, as a generality, it may reasonably be estimated that surfaces treated in accordance with this invention should be skewed at least about 20 degrees to a horizontal axis to be effective. In the case of flying insects such as flies, gnats, or mosquitoes, and hopping insects, such as fleas, surfaces treated in accordance with this invention will prevent these pests from alighting or resting on steeply slanting surfaces, such as walls or ceilings.

It has been observed that the surface characteristics of the film forming materials of this invention may change when the film becomes wet with water. When a surface which has been prepared in accordance with this invention is exposed to the outdoor elements like snow, rain or high humidity, it may re-wet and lose its effectiveness in preventing insects from crawling on its surface. It is believed that the tendency of the film to re-wet is largely a function of the surfactant used in preparing the dispersion and it has been established that the problem can be overcome either by utilizing a surfactant that does not re-wet, or by removing the surfactant after the film has been formed. In this latter instance, it noted that some surfactants are naturally destroyed by exposure to an outdoor environment and UV light and other surfactants can be leached from a film by washing the film with a solvent which, depending upon the surfactant, may include water, alcohols, acids, bases and the like. However, when surfactants are removed by leaching, it is a sine qua non that the coatings must adhere to the substrate well enough to prevent the coatings from being washed away during the leaching process.

In the preferred practice of this invention, aqueous dispersions are stabilized from the harmful effects of freeze/thaw cycles to permit their transportation and storage during colder times of the year. Suitable stabilizers for use in the dispersions of this invention include monohydric alcohols of less than five carbon atoms that form clathrates with water, polyhydric compounds, and the amine analogs of the alcohols and polyhydric compounds. These stabilizers are disclosed PCT patent application filed Apr. 30, 1992 Ser. No. 92/03630 in the name of Thomas H. Eberlein and PCT patent application filed Apr. 30, 1992 Ser. No. 92/03647 in the names of Thomas H. Eberlein and Allan H. Olsen both entitled "Aqueous Dispersions Stabilized from Freeze/Thaw Cycles" which are incorporated herein by reference.

The solids which are used to form the dispersions of this invention average less than 0.5 microns when measured along their major axis. The small size of the particles is responsible for making a surface difficult for an insect to climb and it is suspected the small particle size contributes to the formation of a more adherent film.

Here and elsewhere in the specification and claims, the dried residue that remains after a dispersion of the invention has been applied to a surface is referred to as a "film" since it appears to the naked eye to be continuous and since it is known that it will be effective to control the movement of insects only if it is free from discontinuities and other anomalies that will enable an insect to grip the surface of a film, On the other hand, the "film" has little or no tear strength and, unless applied to an adhesive substance as is discussed below, the dried coating cannot be peeled away from a surface without destroying the "film". For this reason, and since a better term does not suggest itself, it should be understood that the term "film" as used herein may not be entirely consistent with some definitions of the term.

The fluorocarbon resins that are of utility in the practice of the present invention are fluorocarbon polymers prepared by dispersion polymerizations and include polytetrafluoroethylene (PTFE), fluorinated ethylene-propylene (FEP) and perfluoroalkoxy (PFA). The dispersion grades of these resins are commercially available in particle sizes ranging from about 0.05 to about 0.5 microns, at solids concentrations of about 60 wt % dispersing agents, balance water, and in viscosities of from about 20 to about 27 centipoise. Since polytetrafluoroethylene resins are the most widely available, known and used of the fluorocarbon resins, the specification and claims refer specifically to this member of the group although it is to be understood that the term "polytetrafluoroethylene" as used in the specification and appended claims is meant to include other dispersion grade fluorocarbon resins.

DETAILED DESCRIPTION OF THE DRAWINGS

Figure 1:
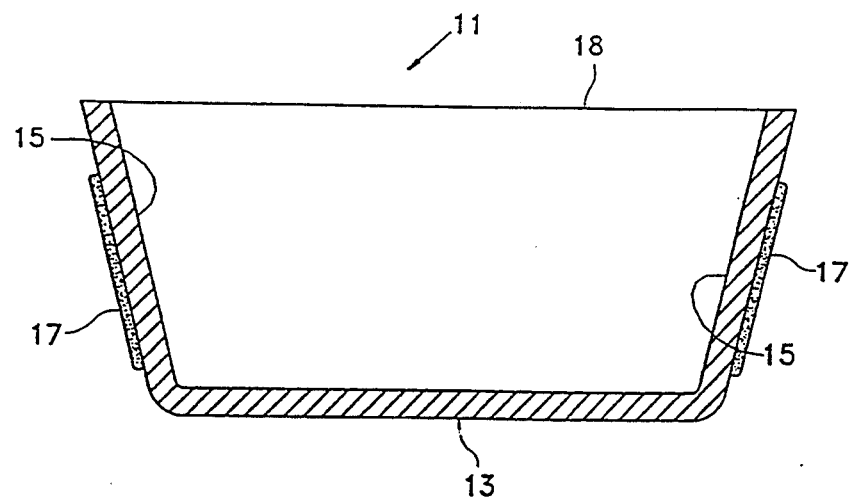
FIG. 1 is a sectional view of a pet dish adapted for use in the practice of the invention.

FIG. 1 illustrates this invention as used to protect a pet food dish 11 from an incursion of crawling insects and, in particular, ants. The pet dish 11 is comprised of a base 13 and a side wall 15. A portion of the side wall 15 is shown coated with a film 17 formed in accordance with this invention extending around the entire periphery of the pet dish 11. This film will prevent ants and other crawling insects from climbing up the sidewall 15 and into the dish 11.

In a similar manner as illustrated in FIG. 1, a film comprised of the finely divided particles of this invention may be applied to the side surfaces of many different objects and prevent insects from crawling up these surfaces. While not shown in the drawings, it can be understood that the invention as illustrated in FIG. 1 can be used on such objects as the legs of lawn chairs and tables, the outside of buckets or other containers, around the handles of garden tools, on the pedestals of outdoor grills, on the wheels of baby buggies, and so on almost without limit.

The invention also finds utility in preventing insects from crawling on animals and humans. One aspect of the invention lies in applying films to articles of wearing apparel including boots and shoes, ankle protectors, outer garments such as overalls, decontamination gear and such like. The films of this invention also may be applied to mats, platforms, outdoor furniture and other articles that are designed to rest on or be supported by the ground.

Figure 2:
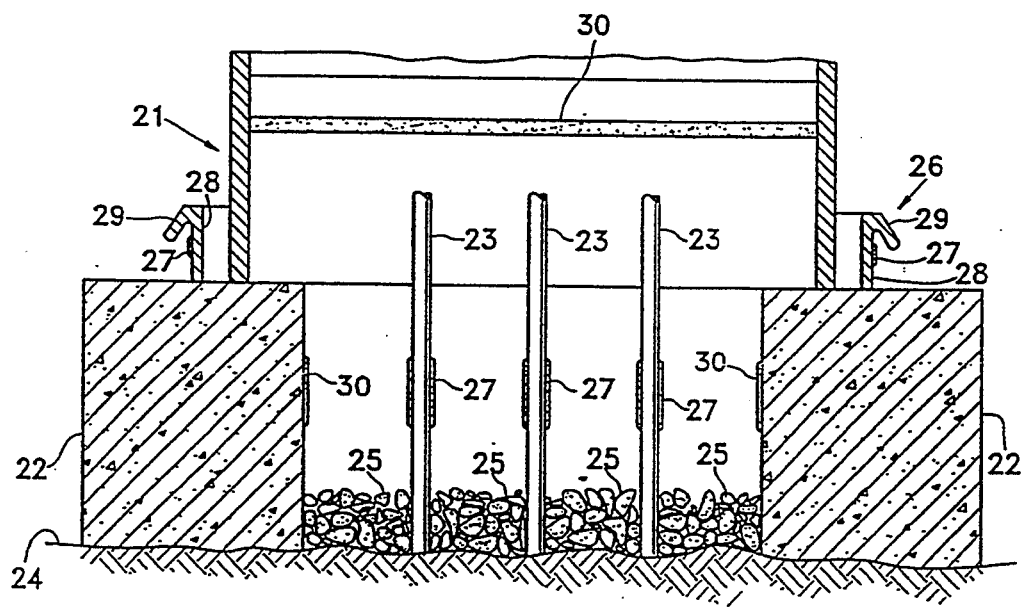
FIG. 2 is a cut away and somewhat schematic view of the lower portion of an electrical device mounted on a ground level pad.

In FIG. 2 there is shown a schematic cutaway view of the lower side wall 21 of an electrical device, such as a switch box, transformer, junction box or the like, mounted on a cement pad 22 which in turn rests on the ground 24. Cables 23 pass upwardly through the ground 24 into the interior of the device. Shown mounted on the cement pad 22 is a protective sleeve 26 that surrounds an exterior portion of side wall 21 of the electrical device. The protective sleeve 26 is comprised of an upstanding wall 28 and an outwardly and downwardly directed protective flange 29 mounted on the top edge of the wall 28.

A coating 27 is illustrated as having been applied as a circumferential band to the cables 23 and to an upper portion of the wall 28. Note that the coating 27 on the wall 28 of the sleeve 26 is protected from exposure to the elements by the down turned flange 29.

While the sleeve 26 is here illustrated for use with an electrical device, it has general applicability wherever it is desired to protect the coating from the outdoor environment or to protect it from mechanical damage as by scratching, bumping or other mishandling.

A protective sleeve such as illustrated in the drawings may also provide a mechanism by which the film of this invention can be applied to an object. It is within the scope of this invention to coat continuous lengths of a tape or foil with the dispersions of this invention and then unwind the tape or foil, wrap the tape or foil around and adhere it, as by a pre-applied pressure sensitive adhesive, to any surface that is to be made resistant to the movement of crawling insects. This is a convenient way in which a protective coating may be adhered to the trunk of a tree, to a cement or wooden surface, to the legs of a wooden picnic table and so on and so on.

In FIG. 2 the side walls of the cement pad 22 as well as the lower side walls 21 of the electrical housing are illustrated as being coated with a band 30 of a protective film applied from a dispersion of this invention. Since the cement pad 22 is porous, a sealant should first be applied to its surface before the band 30 is coated on the surface or, in the alternative, a coated pressure sensitive tape as discussed above can be used.

The cables 23 are surrounded at ground level 24 with a layer of stones 25 which have been coated with a film prepared in accordance with this invention. The stones 25 fill the entire spaces between the cables 23 and the wall 28 so that insects can not build their mounds within the confines of the cement pad 22. Further, to the extent that any ants succeed in entering the electrical device 21, they will be unable to climb the cables 23 past the protective coating band 27.

Many different types of electrical devices are natural targets for infestation by ants. These include ground landing lights at airports, television and telephone junction boxes, patio lights, traffic signal controllers, transformers of all sorts including both ground level and pole mounted, etc. When ants overrun and take up residence in these devices, it is not uncommon to find that the device malfunctions or is rendered inoperative. Ants can be discouraged from infesting devices of this kind by taking care to apply an insect controlling film barrier to the inside and outside walls of the electrical devices, to the wires within the devices that rise vertically from the ground and to stones which should be scattered over the bottom surface of the electrical devices.

Figure 3:
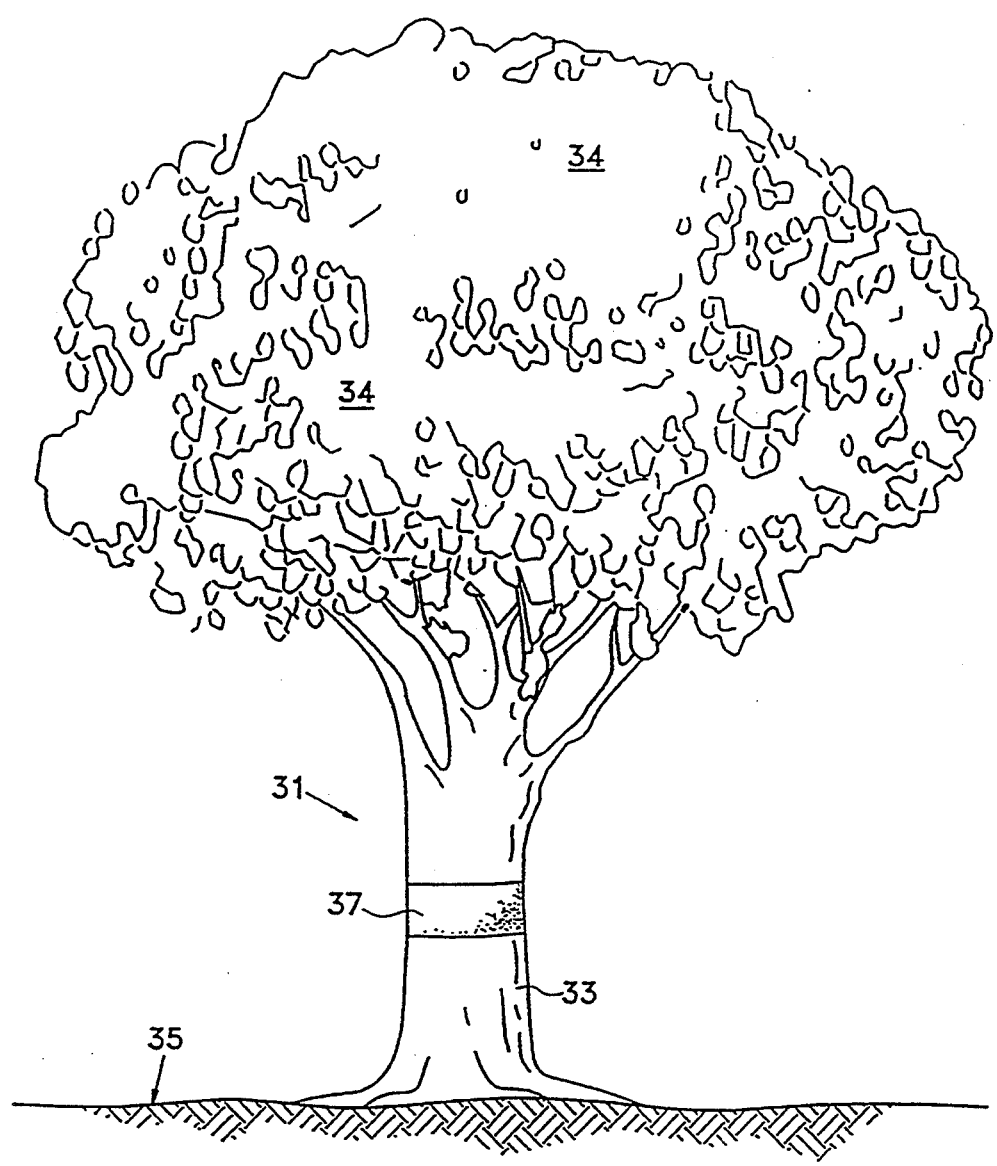
FIG. 3 is a schematic illustration of the trunk of a tree having a protective band applied in accordance with this invention.

FIG. 3 is a schematic illustration of a tree 31 with its trunk 33 rising above the ground 35. To prevent crawling insects, gypsy moths for example, from climbing up the trunk 33 and infesting and eating the leaves 34 of the tree 31, a protective band 37 is shown adhered to the circumference of the trunk 33. The protective band 37 may be a strip of metal foil or tape which is coated with a protective film on one side and an adhesive on the other side. The tape may be securely pressed against and adhered to the trunk 33 of the tree 31 thus providing a barrier to prevent crawling insects from climbing the tree.

Figure 4:
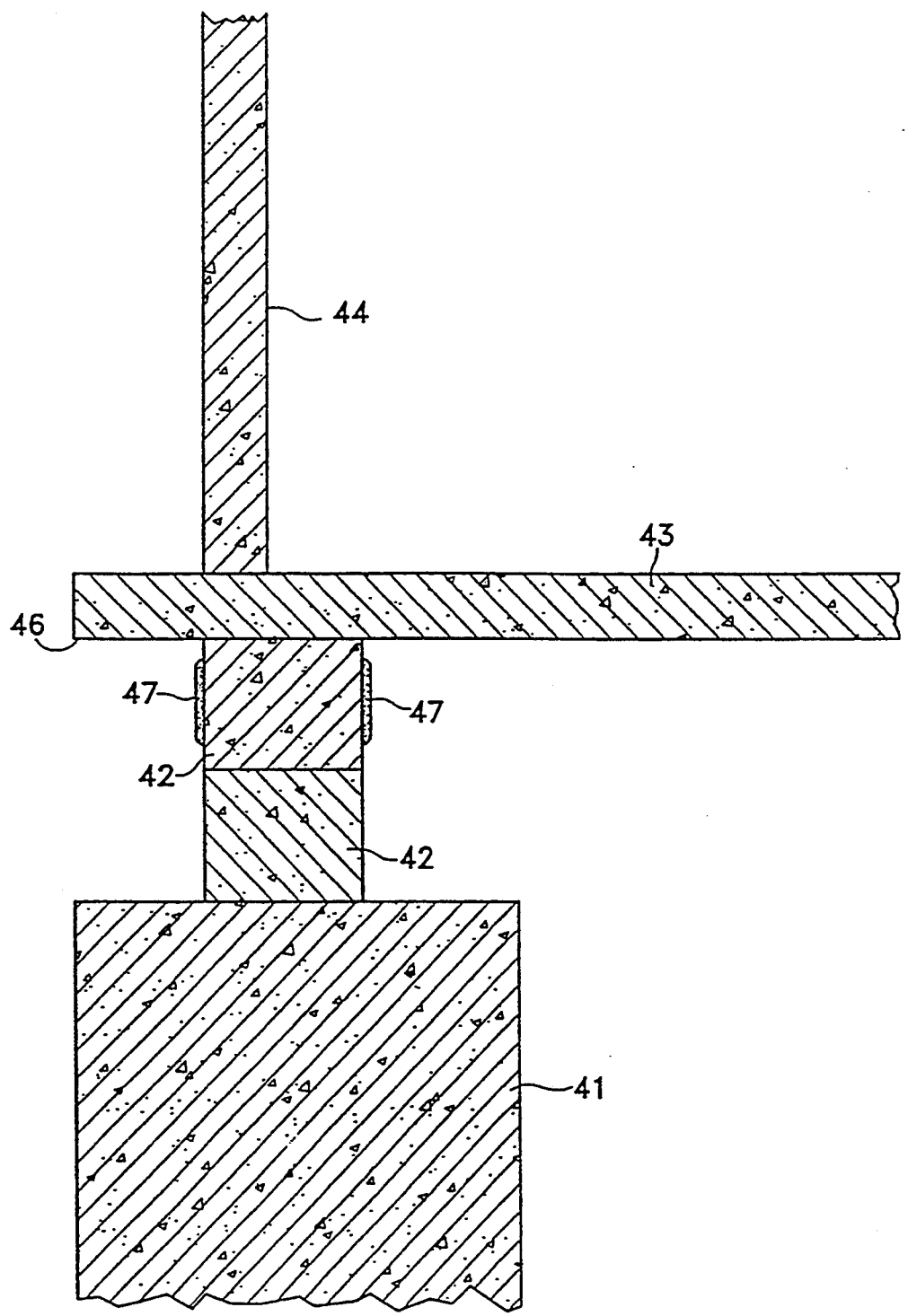
FIG. 4 is a sectional view of a small portion of a building showing the foundation and first floor at ground level.

FIG. 4 is an illustration of the invention as used to protect a building from infestations by crawling insects, particularly ants and termites. Here there is rather schematically illustrated a small portion of a building at ground level. A concrete support pier 41 supports two courses of concrete blocks 42. Mounted on the concrete blocks 42 is a concrete pad 43 that serves as the ground floor of the building. As illustrated in the drawing, the pad 43 has an overhang 46 that extends slightly outboard and beyond the concrete blocks 42. An outside wall 44 is mounted on the slab 43 and extends therefrom in an upwardly direction.

To protect the building from the entry of crawling insects, a film 47 has been affixed to the exposed sides of the concrete block 42. As discussed in connection with the film 37 attached to the tree 33 in FIG. 3, the film 47 may be sprayed directly onto the block 42; it may be sprayed onto a base coat previously applied to the block 42; it may be applied to a tape previously adhered to the block 42; or the film 37 may be pre-coated onto the surface of a tape which is subsequently affixed to the block 42.

As illustrated in FIG. 4, the film 47 is protected from abrasion, the weather, rain and UV light on one side of the block 42 because of the overhang 46 and on the other side of the block because it is entirely protected within the building structure. While not necessary to do so, protective device such as the sleeve 26 illustrated in FIG. 2 may be used to protect the film 47 from direct exposure to the elements.

Figure 5:
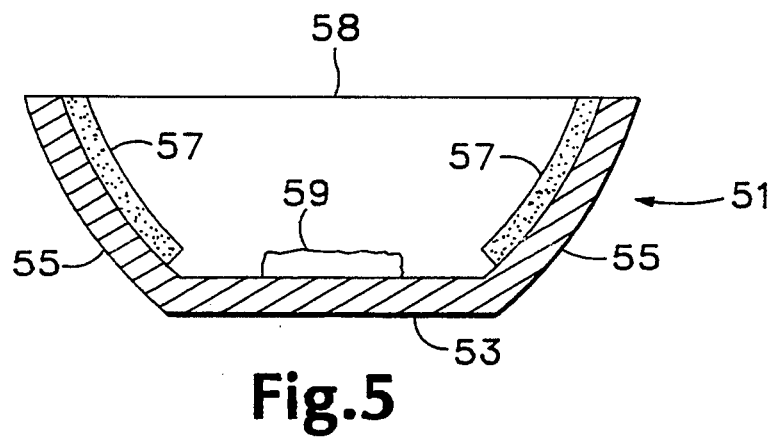
FIG. 5 is a sectional view of an insect trap made in accordance with this invention.

A trap for crawling insects made in accordance with this invention is illustrated in FIG. 5. In this schematic view, the insect trap is illustrated as a bowl 51 having a closed bottom portion 53, sloping sidewalls 55, and an open upper end defined by the rim 58 of the open bowl 51. A coating made in accordance with this invention is applied in a continuous circumferential ring 57 on the inside surface of the side wall 55. When a crawling insect climbs up the outer surface of the sidewall 55 of the bowl 51, crawls over the rim 58 and starts down the inside of the side wall 55, the insect looses its grip as it crawls over the circumferential ring 57 and will fall the bottom of the bowl 53. Once on the bottom of the bowl 53, the crawling insect cannot climb back out of the bowl since it will be unable to grip the surface of the circumferential coating 57 and, accordingly, will be confined within the trap. Crawling insects may be encouraged to climb into the trap by placing an attractive bait 59 on the inside of the bowl. The bait 59 can be, for example, a food or a sexual attractant.

Figure 5A:
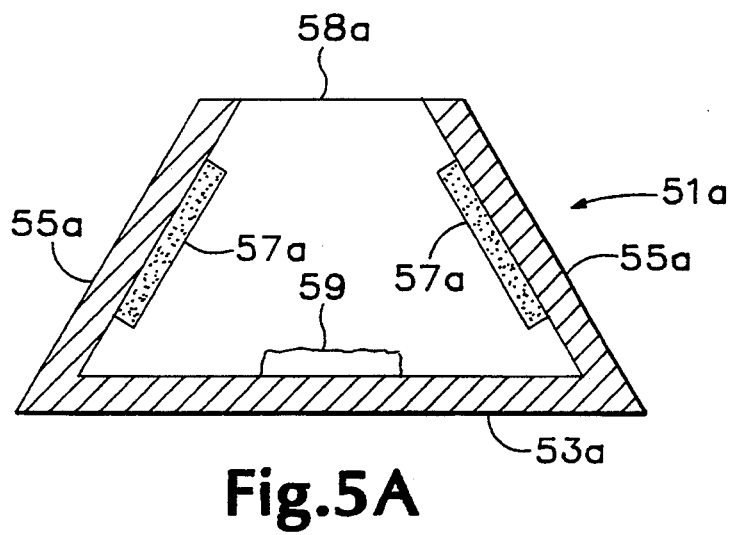
FIG. 5A is a sectional view of a variation of the insect trap of FIG. 5.

FIG. 5a illustrates a trap similar to the trap of FIG. 5 (the reference numerals are the same with the suffix "a" added) except that the side walls 55a are slanted inwardly toward the interior of the bowl 51a. The purpose of this illustrative design is to make it easier for insects to crawl up the outside of the side wall 55a and more difficult to climb the inside of the side wall 55a.

Comparatively lower viscosity dispersions are less sensitive to changes in temperature than are those of higher viscosity. This principle is illustrated by the family of curves shown in FIG. 6. Here there is plotted the viscosity response of dispersions of different viscosity levels to increases in temperature, beginning at a starting temperature of about 5° C. It can be seen that if the starting viscosity at 5° C. is about 27 centipoise, the viscosity will begin rising geometrically if the temperature is increased to only about 25° C. and above. Similarly, starting viscosities of about 24 centipoise rise dramatically beginning at ambient temperatures of over about 30° C.

Figure 6:
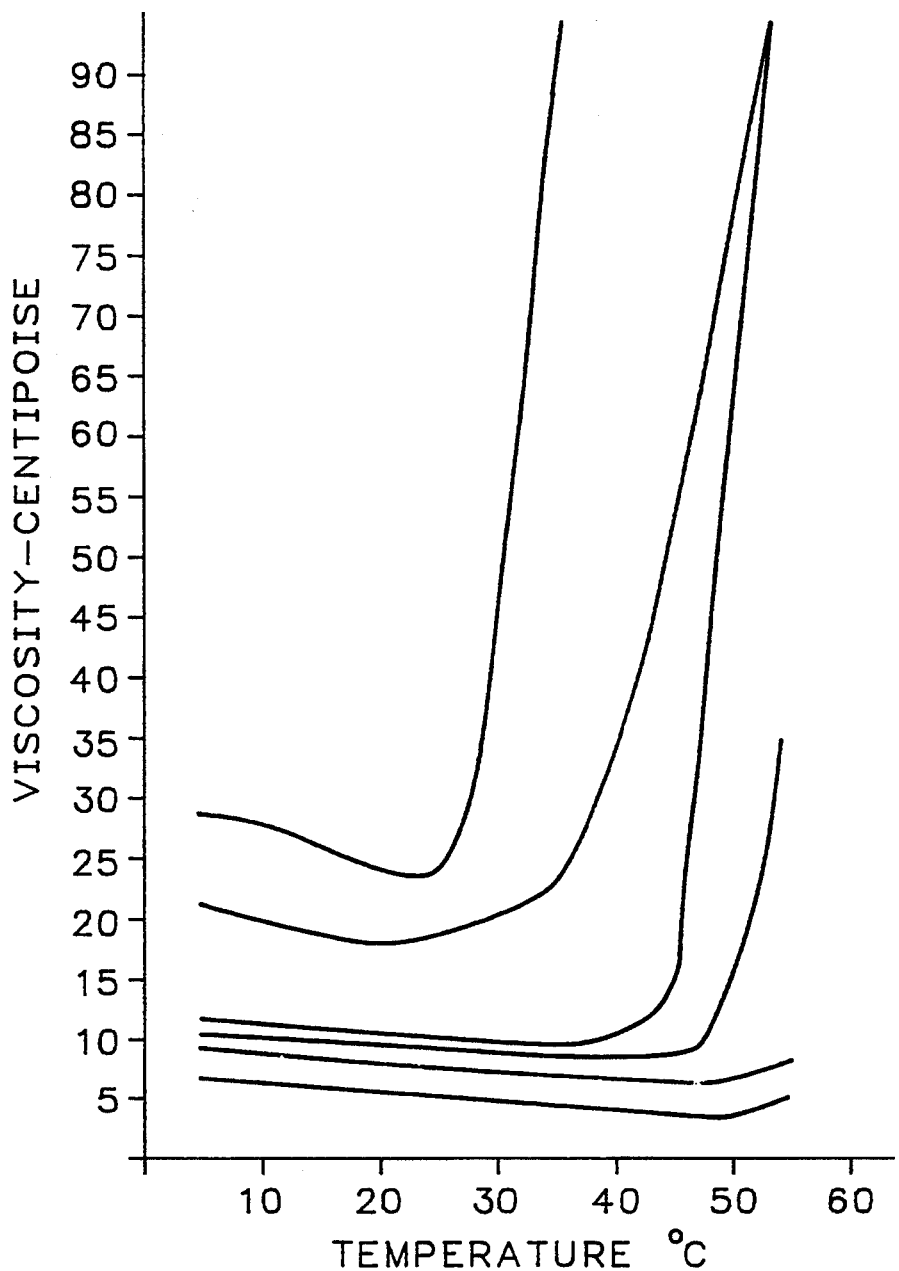
FIG. 6 is a graph in which viscosity in centipoise is plotted on the ordinate versus temperature on the abscissa showing the effect of temperature on the viscosity of dispersions of fluorocarbon resins having a particle size of 0.05 to 0.5 microns formulated at a number of different viscosities.

The lower four curves of FIG. 6 indicate that when the initial viscosity of the dispersion is less than about 12 or 13 centipoise, essentially no change occurs in the viscosity of the dispersions until the ambient temperature exceeds about 40° C. In the case of dispersions having viscosities of about 10 centipoise and below, no significant changes in viscosity were measured even at temperatures in excess of 50° C., at which point further testing was discontinued.

Figure 7:
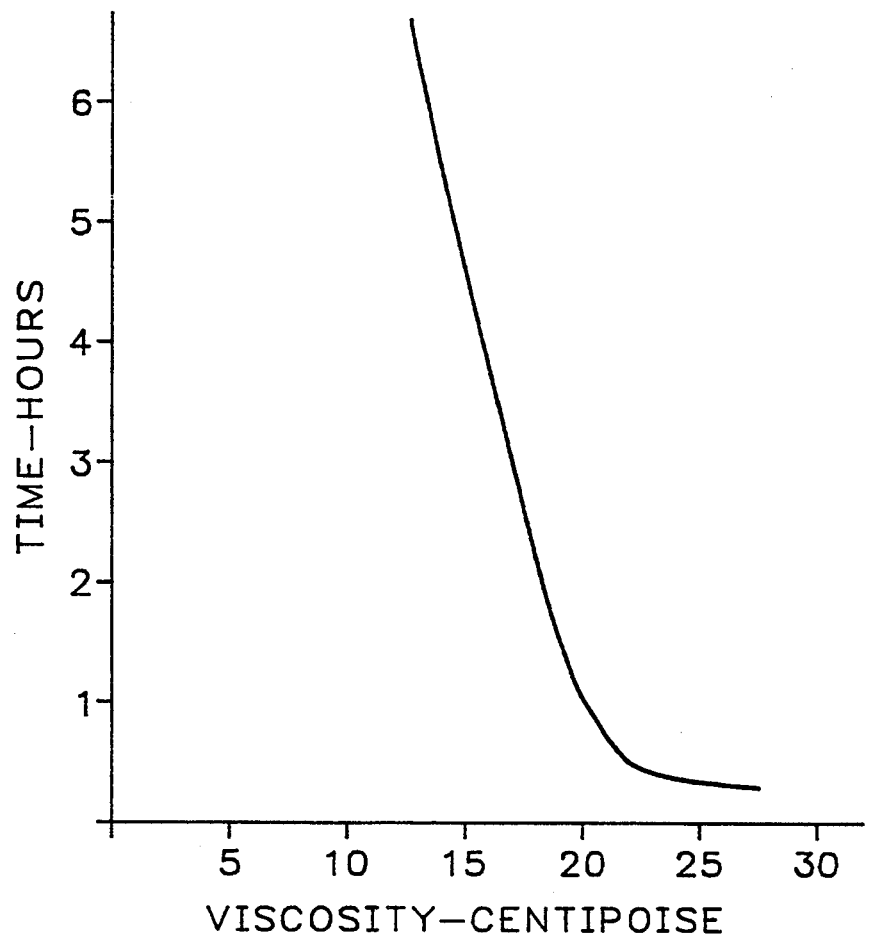
FIG. 7 is a graph showing the shear stability of a polytetrafluoroethylene dispersion of 0.05 to 0.5 micron particles at various dispersion viscosities. The time to destruction of the dispersions when subjected to high shear forces is plotted on the ordinate and the viscosity of the dispersion is plotted on the abscissa.

FIG. 7 is a graphic representation of the test results of Example VII. This shows that the that the stability (i.e. absence of coagulation) of the polytetrafluoroethylene dispersions of this invention, when subjected to high intensity mixing, can be extended from a fraction of an hour at a viscosity of 27 to over 4 hours if the viscosity of the dispersion is lowered to 17 centipoise.

Figure 8:
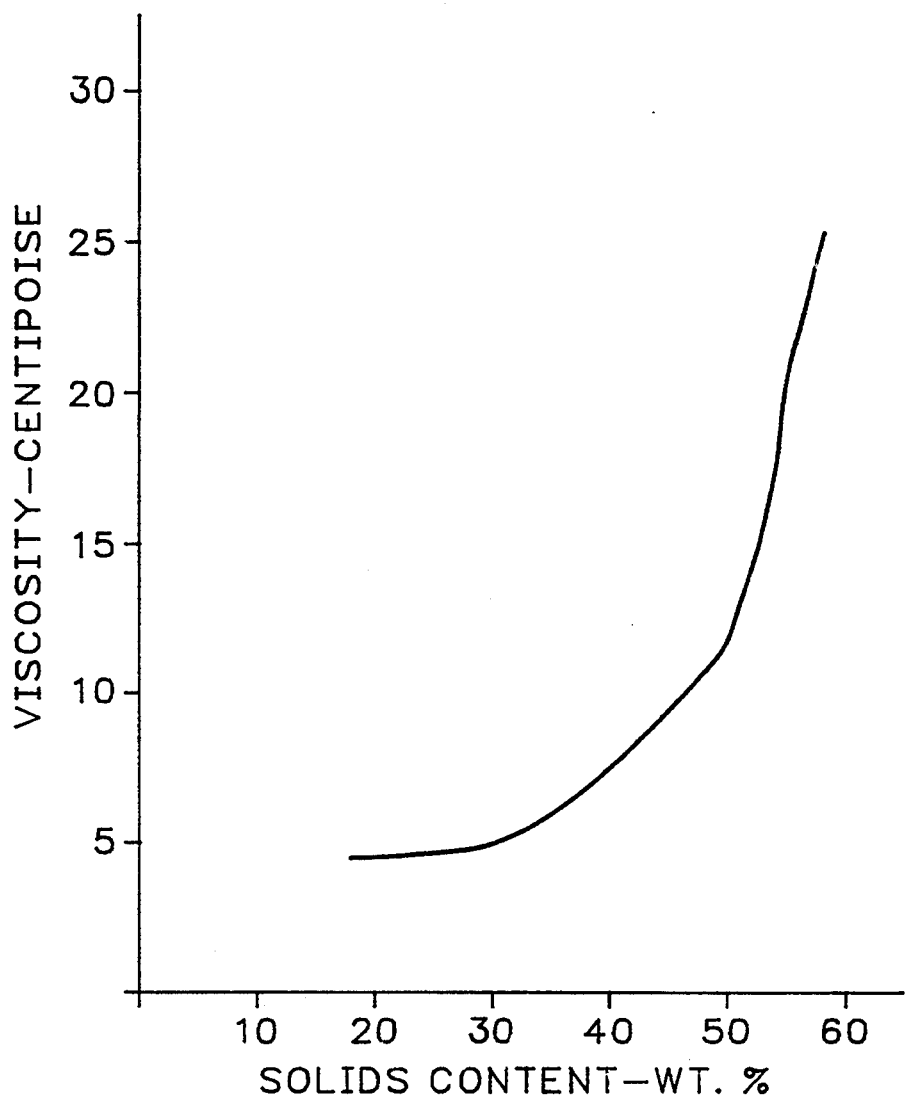
FIG. 8 is a graph showing the effect of dilution on the viscosity of a polytetrafluoroethylene dispersion in which viscosity is plotted on the ordinate and solids concentration on the abscissa.

The effect of dilution upon the viscosity of the polytetrafluoroethylene dispersions of this invention is illustrated by the curve of FIG. 8. The curve was generated based upon a starting material of an aqueous dispersion containing approximately 60 percent, by total weight, of 0.05 to 0.5 micron polytetrafluoroethylene resin particles suspended in water and approximately 8%, by weight of polytetrafluoroethylene, of a nonionic wetting agent and stabilizer. This material is available from DuPont under its trade designation Teflon ® 30B. The single curve of FIG. 8 shows that if the dispersion is diluted, as with water, to reduce the resin solids from 60 to 55 wt %, the viscosity falls precipitously from 24 centipoise to 14 centipoise and that a further small dilution to 50 wt % resin solids further reduces the viscosity to about 10 centipoise. Continued dilution of the dispersion of from about 50 wt % resin solids to about 20 wt % resin solids results in only a comparatively minor change in the viscosity. To the best of the knowledge of the inventor, the prior art has not recognized that the dilution of a 60% aqueous dispersion of polytetrafluoroethylene resin particles by only about 5% will cause a 40% reduction in viscosity, i.e from about 25 centipoise to about 15 centipoise. Analogous results were obtained when viscosity vs. solids concentrations measurements were made with DuPont's closely related product sold under its trade designation Teflon ® 30. It is so made clear that the viscosity of the dispersions of this invention do not bear a straight line relationship to the % solids at higher solids concentration.

Many of the benefits obtained by adjusting the viscosity of polytetrafluoroethylene dispersions to below about 13 to 15 centipoise as here disclosed, have applications that reach well beyond the application of the coatings of the instant invention. Use can be made of the viscosity reduction of polytetrafluoroethylene dispersions in those instances in which, inter alia, one wishes to extend shelf life, diminish sensitivity to coagulation by agitation, shear and elevated temperatures, and avoid fibrillation of the resin particles.

In the above illustrations of the utility of this invention, vertical surfaces were coated with a film to prevent the movement of crawling insects. The width of the applied film is important since it must be wider than the length of the insect. Otherwise the insect can extend its body length over the width of the film and continue on its way. In the special case of ants which are able to build a pyramid with their bodies when the occasion demands, the width of the protective film must be considerably wider than the length of the body of an ant to prevent the ants from making a bridge around or over the film. For this reason, the width of the film should exceed the length of the insect by several fold, depending, of course, on the agility and cooperative abilities of the insects.

Similarly, if protection from hopping insects such as fleas is desired, it is obvious that the width of the protective film must exceed the distance that the insect can hop or jump.

EXAMPLES

In the Examples that follow, the dispersions were prepared by adding the ingredients together and mixing them well by mechanical agitation. A Waring type blender is well suited to this purpose although other mechanical mixing devices can be used. In the Examples, the quantities are given by weight unless otherwise noted.

EXAMPLE I

In the tests that follow, a direct comparison has been made between the use of the dispersions disclosed in the above referenced European patent application 0 160 712 A1 and the lower viscosity dispersions of the instant invention. In all of the tests, an object was coated with a commercially available first dispersion as disclosed in the European patent application which have viscosities ranging from about 20 to 27 centipoise and another similar object was coated with a second dispersion of the instant invention in which the viscosity was adjusted by water dilution to a lower viscosity. Both the first and second dispersion used were comprised of polytetrafluoroethylene resins in the size range of from about 0.05 to 0.5 micron sized particles.

A. The first and second dispersions were poured over onto the inside walls of a funnel. The dispersion used to coat the first funnel had a viscosity of about 24 centipoise and the dispersion used to coat the second funnel had a viscosity of about 8 centipoise. The cone angle of the funnels was 60°. The coatings were dried while resting their larger open ends on a horizontal surface. After the dispersions had dried, the coatings on the funnels were washed with equal amounts of water. The funnels were then placed in a bed of active ants. The ants were readily able to crawl up the surface that had been coated with the 27 centipoise dispersion and washed, but they could not move up the funnels that had been coated with the 8 centipoise dispersion and washed.

It is believed that the lower viscosity of the 8 centipoise dispersion permitted the wet dispersion to flow off of the side walls of the funnel, thus producing a thinner (less than 1 mil) and more adherent coating which was not removed by washing. In contrast, the higher viscosity dispersion produced a thicker coating which was washed away by the water.

B. Two plastic plates were laid out in a horizontal position on a table and coated with the first and second dispersion, the latter having a viscosity of about 13 centipoise. After the coatings had dried while being maintained in the horizontal position, they were placed vertically on top of an active colony of ants. The ants were able, with some difficulty, to climb the plate coated with the first dispersion, but were unable to climb the plate coated with the second dispersion. This test shows that if the viscosity of the dispersion used to coat a surface is relatively high, i.e. above about 15 centipoise, the positioning of the substrate during the drying time effects the performance of the coating. Presumably, when the viscosity of the coating is relatively high and the surface of the substrate is not vertically positioned during drying, the higher viscosity dispersion does not run off the horizontally positioned substrate and the dried coating exceeds the desired 1 mil thickness.

C. Plastic plates were coated with the first and second dispersions of B. above and dried while the plates were held in a vertical plane. After the coatings had dried, a commercially available transparent pressure sensitive tape (Scotch® brand) was pressed and adhered to the coated surfaces of the plates. When the tapes were removed from the coated plates, it was observed that most of the coating applied from the first higher viscosity dispersion was adhered to the tape and removed from the plate. However, when the tape was removed from the plate coated with the lower viscosity dispersion (i.e. about 13 centipoise) only a few resin particles were adhered to the tape and the coating remained substantially intact.

EXAMPLE II

Two dispersions of polytetrafluoroethylene resins of 0.05 to 0.5 micron sized particles were sprayed onto a flat plastic plate and allowed to dry in a vertical position. The first dispersions had a viscosity of about 27 centipoise and the second dispersions had a viscosity of about 8 centipoise. Both of the plates were placed in an upright position with one of the edges of each plate placed in contact with an active ant mound. The ants could not gain a foot hold on either of the plates and were totally unsuccessful in their attempts to scale them.

The coated plates were removed from the ant mound and heated in an oven to about 50° C. and replaced in contact with the ant mound. This time the ants could, with some difficulty, climb the plate that was coated with the first dispersion of 27 centipoise but remained unable to climb the plate coated with the second dispersion of 8 centipoise.

In this and other similar experiments it was determined that coatings applied from dispersions having viscosities of less than 15 centipoise, and preferably less than 13 centipoise, remain effective over a wide range of ambient temperatures without loosing their effectiveness whereas coatings applied from higher viscosity dispersions lose their effectiveness at elevated ambient conditions such as may reasonably be encountered during hot weather.

EXAMPLE III

It has been found that the viscosity of dispersions of fluorocarbon resins is significantly temperature sensitive. A number of tests were conducted to determine the effect of temperature on dispersions of varying viscosities. The results of these tests are shown in FIG. 6 where it can be seen at viscosities of well over the desired level of 15 centipoise, even at lower temperatures of from about 25° to 35° C. the viscosities begin to increase markedly. With further reference to the curves of FIG. 6 it is shown that if a dispersion has an initial viscosity of less than about 13 centipoise, no increase in the viscosity of the dispersions will occur until temperature of over 45° C. is reached. Further, dispersion having viscosities less than about 10 centipoise show no significant change in viscosity throughout the entire temperature range measured. It follows that when the dispersion is formulated at viscosities of 15 centipoise or less, the dispersions will prove useful under at any reasonably expected ambient coating temperature.

EXAMPLE IV

Two sets of aerosol spray containers were charged with dispersions of 0.05 to 0.5 micron particles of polytetrafluoroethylene. The propellant was nitrogen gas under a pressure of 60 lbs/in$^2$. The dispersions in the first cans were dispersions having a viscosity of about 27 centipoise and the second cans contained the same polytetrafluoroethylene particles but the viscosity was reduced, by water dilution, to a viscosity of only about 7 centipoise.

The spray orifice of one of the first sets of cans was depressed to spray its contents. After continuously spraying from the first can for a period of time of only a few seconds the spray orifice became plugged with fibrillated particles of polytetrafluoroethylene and it was no longer possible to spray anything out of the can. This test was repeated with one of the second sets of cans and the spray was continued uninterrupted until the contents of the can were exhausted. Upon examination of the orifice of the second cans, there was no visible evidence of any plugging of the orifice nor of the formation of any fibrillated polytetrafluoroethylene. These and other similar tests made with viscosities varying from about 24 to 5 centipoise established that fibrillation does not occur and spray orifices do not plug under the stated conditions if the viscosity is established at less than about 13 centipoise.

EXAMPLE V

Two sets of aerosol spray cans where prepared as in Example IV above. The cans were tested by spraying several short bursts of about 5 seconds each. The cans were set aside for 24 hours and when an attempt was then made to spray dispersions from the cans it was found that the feed tube in the cans charged with a polytetrafluoroethylene dispersion having a viscosity of 27 centipoise were plugged and nothing could be sprayed from the cans. In contrast, the feed tubes in the second cans with the 7 centipoise viscosity remained unplugged and fully operational.

EXAMPLE VI

As was previously referred to above, the presence of the dispersing agent in the dried coating applied as a suspension of finely divided fluorocarbon resins may cause the coating to re-wet or absorb moisture. When this occurs, the effectiveness of the coating is lost and insects can readily climb the coating.

It is known that dispersing or suspending agents are generally water soluble and that, therefore, the dispersing agents can, at least in theory, be leached with water from the coating so that the coatings will not re-wet in the presence of moisture such as snow, rain and dew. This creates a practical problem since, if the coating is not adequately adhered to its substrate, the coating will be removed under the same conditions that are required to leach out the dispersing or suspending agent. It has now been found, however, that if the viscosity of the dispersion is reduced to less than 15 centipoise, and preferably less than 13%, the adhesion between the coating and its substrate will be sufficient to prevent the removal of the coating when the dispersing agent is leached out of the coating.

In this Example a first set of plates was coated with a dispersion of polytetrafluoroethylene resin particles of about 0.05 to 0.5 microns in size having a viscosity of about 24 centipoise. A second set of plates was coated with the dispersion except that it was diluted with water to a viscosity of about 7 centipoise. One of the plates from each set was immersed in cold water (about 8° C.) and about every minute the plates were removed to determine if the dispersing agent had been leached out sufficiently to make the coatings non-rewetable. The coatings were deemed non-rewetable when water beaded on their surfaces and could be shaken off.

After about two minutes, the coating applied from the higher viscosity dispersion began to come off and, after about six minutes of immersion, the coating was almost completely removed. The failure in the coating was reached before the coating became non-rewetable.

In contrast to the foregoing, the coating applied from the 7 centipoise viscosity dispersion remained on the plate without apparent damage during five minutes immersion at which time the coating was then non-rewettable. When the test plate was placed on an active ant hill after the leaching cycle, the ants were unable to climb the plate.

The above test procedure was repeated, but this time the plates were immersed in water heated to 50° C. After 30 seconds exposure in the heated water, the specimen with the higher viscosity was completely removed from the plate but the specimen coated with the lower viscosity dispersion remained unaffected.

The specimen prepared from the lower viscosity dispersion was returned to the heated water bath for an additional minute and a half. When removed from the bath after a total immersion time of 2 minutes, the coating was non-rewetable. The treated specimen was placed on an active ant hill and the ants could not climb up its surface.

The coatings of this invention, as described above, can be utilized to prevent crawling insects from climbing on rough surfaces such as the bark of trees. Because of the irregularities in the bark, it has been suggested that the coatings be applied to a continuous web of material, such as the smooth side of a pressure sensitive tape, and the web adhered to the circumference of the tree. When a web of material is coated in a continuous length and it is desired to wash out the dispersing agent to make the coating non-rewetable, a hot water bath may be located down stream from the coating station. By this means, the dispersing agent may easily be leached from the coating in an in-line continuous process before the web is wound on a reel for storage and handling.

EXAMPLE VII

The stability of fluorocarbon dispersions of different viscosities was measured by placing the dispersions in a Waring blender and measuring the time until the dispersion was broken and a coagulated mass of the dispersion was formed. It was found that when the starting viscosity of the dispersion was about 25 centipoise, the blender could only be run for about 17 minutes before the dispersion was destroyed. When, however, the viscosity of the dispersion was reduced to about 13 centipoise, the blender could be run for upwards of four hours, when the test was discontinued, with no adverse effect to the dispersion. The data obtained in this Example are presented in FIG. 7 of the drawings.

EXAMPLE VIII

Coating tests were conducted with fluorocarbon resin dispersions at various viscosities to determine the degree of adhesion between the coatings and their substrates at the several viscosities. In these tests, one-eighth inch thick polypropylene plaques were washed in water and detergent and then thoroughly rinsed and towel dried. The cleaned plaques were uniformly sprayed by moving a spray head at a distance of 6 inches from the plaques from the top to the bottom of the plaques. The plaques were vertically aligned and were allowed to remain in this position for 24 hours until they had thoroughly dried.

The plaques were positioned horizontally about 5 inches below an open water tap and warm tap water at a temperature of about 50° C. and a pressure of about 40 #/in² was flowed directly downwardly over the coated plaques at a rate of about 0.9 gallons/minute. The plaques were removed from the stream of tap water and examined to estimate the amount of the coating that had been removed by the treatment.

Inspection of the plaques showed that the plaques coated with dispersions of viscosities about 24 centipoise and over were completely removed and were useless in preventing ants from climbing on their surfaces. On the other hand, all of the plaques coated at dispersion viscosities of less than 15 centipoise retained their coatings substantially unimpaired. These latter plaques were placed over an active ant hill and it none of the ants could climb these plaques.

EXAMPLE IX

In confirmation of the tests of Example IX above, dog dishes were coated with a dispersion of fluorocarbon resins of about 0.05 to 0.5 micron size having viscosities ranging from about 24 to 27 centipoise. After the coatings were fully dry, the dog dishes were placed in a household dishwasher and run through one wash cycle. Visual inspection showed that the dishwasher had removed all but a trace of the coatings. When the dishes were placed on an active ant colony, the ants climbed the side wall of the dishes without difficulty.

The above procedures were repeated except that the dog dishes were coated with the same polytetrafluoroethylene dispersion after it had been diluted with water to a lower the viscosity of 13 centipoise. No visible damage was done to the coatings after the first wash cycle in the dishwasher and so the dog dishes were washed four more times in the dishwasher. The coatings appeared intact after the five wash cycles and, when the dog dishes were place on top of an active ant hill, the ants tried, but were unable to climb the side walls of the dishes.

EXAMPLE X

In discussing the prior art, supra, mention was made of the fact that entomologists reasonably may have concluded that coatings applied from polytetrafluoroethylene dispersions were effective to prevent insects from climbing walls because of the inherent slipperiness or low coefficient of friction of polytetrafluoroethylene. This was investigated by use of a common, commercially available frying pan which had been coated with a polytetrafluoroethylene dispersion and the resin particles then coalesced (fused) to each other at temperatures somewhat above the crystalline melting point (342° C.) of the polytetrafluoroethylene. The fused smooth coating on the frying pan had a low coefficient of friction typical of polytetrafluoroethylene which is approximately only one-third that of the unfused films of the present invention.

When the frying pan was placed over an active ant colony with the coated surface of the frying pan at right angles to the ground, ants had no difficulty climbing up and over the polytetrafluoroethylene surface. When surfaces prepared in accordance with the present invention were oriented in a like manner over the ant colony, the ants, despite their best efforts, could not climb these latter surfaces. Since the surface that the ants could not climb had a coefficient of friction approximately three times that of the surface of the frying pan, it is believed to be a reasonable conclusion that the coefficient of friction of particles of polytetrafluoroethylene making up the films of this invention are not responsible for the fact that crawling insects cannot climb these surfaces.

EXAMPLE XI

A polytetrafluoroethylene resin dispersion having particles in the range of from 0.05 to 0.5 microns and a viscosity of about 25 centipoise was applied to a thin, flexible, plastic sheet. After the dispersion was fully dried, a portion of the sheet was bent downward at an angle of about 30° away from the plane of the coated surface at which time the coating cracked and pulled away from the line of the bend. The coating appeared to have very little adhesion to the surface of the plastic sheet.

The above experiment was repeated using the same polytetrafluoroethylene dispersion after it had been diluted with water to a viscosity of about 10 centipoise. This time a portion of the sheet was bent to within a few degrees of 180°, that is the sheet was essentially doubled back on itself, without causing the coating to crack and without giving any visible indication that the coating had suffered damaged.

I claim:

1. A method for restricting the movement of insects on a skewed surface comprising the steps of:
    forming a dispersion of finely divided particles of a fluorocarbon resin having an average size of less than 0.5 microns and a surfactant;
    applying the dispersion to the surface as a wet, continuous, thin coating of substantially uniform thickness; and
    evaporating the liquid from the coating to form a continuous film that is free from cracks and discontinuities and which film is adherent to the surface; the improvement comprising:
    adjusting the viscosity of the dispersion to less than 15 centipoise.

2. A method according to claim 1 wherein the viscosity of the dispersion is to less that 13 centipoise.

3. A method according to claim 2 wherein the viscosity of the dispersion is less than 10 centipoise.

4. A method according to claim 1 wherein the viscosity is adjusted by the addition of a water soluble diluent.

5. A method according to claim 1 wherein the dispersion contains a freeze/thaw additive.

6. A method according to claim 5 wherein the freeze/thaw additive is a lower alcohol of less than five carbon atoms.

7. A trap for crawling insects which is a container with a base, side walls and an open top characterized in that a circumferential band of a fluorocarbon resin is coated on at least a portion of the inside of the side walls of the trap in accordance with the method of claim 1.

8. An article of manufacture having surfaces that are inclined to a horizontal plane and upon which insects can not climb, characterized in that the surfaces are coated, at least in part, by the method of claim 1.

9. An article of manufacture having a surface coating which cannot be gripped by insects when the surface is exposed to water, the surface coating comprising a dispersion of finely divided particles of a fluorocarbon resin having an average size of less than 0.5 micron and a surfactant, the viscosity of said coating being less than 15 centipoise, and the surfactant having been leached out of said coating after application thereof.

* * * * *

UNITED STATES PATENT AND TRADEMARK OFFICE
CERTIFICATE OF CORRECTION

PATENT NO. : 5,392,559  
DATED : February 28, 1995  
INVENTOR(S) : Roger H. Long Page 1 of 3

It is certified that error appears in the above-indentified patent and that said Letters Patent is hereby corrected as shown below:

Col. 1, line 46: delete "dinning" and insert -- dining --

Col. 3, line 4: delete "insects" and insert -- insect's --

Col. 3, line 56: delete "loose" and insert -- lose --

Col. 4, line 31: delete "unto" and insert -- onto --

Col. 5, line 22: delete "a" before polytetrafluoroethylene

Col. 6, line 16: delete "92/03630" and insert -- PCT/US92/03630 --

UNITED STATES PATENT AND TRADEMARK OFFICE
CERTIFICATE OF CORRECTION

PATENT NO. : 5,392,559

DATED : February 28, 1995

INVENTOR(S) : Roger H. Long

It is certified that error appears in the above-indentified patent and that said Letters Patent is hereby corrected as shown below:

Col. 6, line 18: delete "92/03647" and insert -- PCT/US92/03647 --

Col. 6, line 36: delete "," after film and insert -- . --

Col. 9, line 41: delete "looses" and insert -- loses --

Col. 9, line 42: delete "fall the" and insert -- fall to the --

Col. 10, line 13: delete first "that the"

Col. 12, line 49: delete "loosing" and insert -- losing --

Col. 13, line 38: delete "where" and insert -- were --

UNITED STATES PATENT AND TRADEMARK OFFICE
CERTIFICATE OF CORRECTION

PATENT NO. : 5,392,559

DATED : February 28, 1995

INVENTOR(S) : Roger H. Long

It is certified that error appears in the above-indentified patent and that said Letters Patent is hereby corrected as shown below:

Col. 15, line 32: delete "it" after and

Col. 15, line 54: delete "place" and insert -- placed --

Signed and Sealed this

Fourth Day of July, 1995

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,392,559
DATED : February 28, 1995
INVENTOR(S) : Roger H. Long

It is certified that error appears in the above-indentified patent and that said Letters Patent is hereby corrected as shown below:

On the title page, item [73] Assignee change from "Bend Research, Inc." to --Consep, Inc. --.

Signed and Sealed this

Thirty-first Day of October 1995

Attest:

BRUCE LEHMAN

*Attesting Officer*  Commissioner of Patents and Trademarks